(12) United States Patent
Jeon et al.

(10) Patent No.: US 11,973,207 B2
(45) Date of Patent: Apr. 30, 2024

(54) CELL UNIT FOR BATTERY MODULE

(71) Applicant: SK ON CO., LTD., Seoul (KR)

(72) Inventors: Hae Ryong Jeon, Daejeon (KR); Seok Min Kim, Daejeon (KR); Seok Hwan Lee, Daejeon (KR); Seung Hoon Ju, Daejeon (KR); Ha Neul Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/099,262

(22) Filed: Jan. 20, 2023

(65) Prior Publication Data
US 2023/0155210 A1 May 18, 2023

Related U.S. Application Data

(62) Division of application No. 15/931,366, filed on May 13, 2020, now Pat. No. 11,588,193.

(30) Foreign Application Priority Data

May 14, 2019 (KR) ........................ 10-2019-0056206

(51) Int. Cl.
*H01M 10/65* (2014.01)
*H01M 10/42* (2006.01)
(Continued)

(52) U.S. Cl.
CPC ..... *H01M 10/6556* (2015.04); *H01M 10/425* (2013.01); *H01M 10/613* (2015.04);
(Continued)

(58) Field of Classification Search
CPC ......... H01M 10/6556; H01M 10/6554; H01M 10/613; H01M 10/617; H01M 10/653;
(Continued)

(56) References Cited

U.S. PATENT DOCUMENTS

2015/0283965 A1* 10/2015 Lynds .................. B60K 6/28
361/434
2018/0191041 A1 7/2018 Jeon et al.

FOREIGN PATENT DOCUMENTS

EP          3528314 A1      8/2019
KR    10-2014-0056835 A    5/2014
(Continued)

OTHER PUBLICATIONS

Extended European Search Report for the European Patent Application No. 20174633.6 issued by the European Patent Office dated Oct. 15, 2020.
(Continued)

*Primary Examiner* — Raymond Alejandro
(74) *Attorney, Agent, or Firm* — IP & T GROUP LLP

(57) ABSTRACT

A cell unit includes a plurality of battery cells disposed on both surfaces of a unit plate. A case accommodates the cell unit and provided with a cooling device on at least one surface of the case. The unit plate includes a plurality of receiving spaces formed by a plate portion, having a flat surface, and a side portion protruding upwardly and downwardly of the plate portion from both sides of the plate portion. The plurality of battery cells are received in each of the receiving spaces.

7 Claims, 7 Drawing Sheets

(51) Int. Cl.
*H01M 10/613* (2014.01)
*H01M 10/653* (2014.01)
*H01M 10/6555* (2014.01)
*H01M 10/6556* (2014.01)
*H01M 50/20* (2021.01)
*H01M 50/502* (2021.01)
*H01M 50/505* (2021.01)
*H01M 50/211* (2021.01)
*H01M 50/278* (2021.01)
*H01M 50/503* (2021.01)
*H01M 50/516* (2021.01)
*H01M 50/522* (2021.01)

(52) U.S. Cl.
CPC ..... *H01M 10/653* (2015.04); *H01M 10/6555* (2015.04); *H01M 50/20* (2021.01); *H01M 50/502* (2021.01); *H01M 50/505* (2021.01); *H01M 50/211* (2021.01); *H01M 50/278* (2021.01); *H01M 50/503* (2021.01); *H01M 50/516* (2021.01); *H01M 50/522* (2021.01)

(58) Field of Classification Search
CPC ......... H01M 10/6555; H01M 10/6557; H01M 10/425; H01M 50/502; H01M 50/505; H01M 50/503; H01M 50/20; H01M 50/202; H01M 50/278; H01M 50/516; H01M 50/211; H01M 50/522
See application file for complete search history.

(56) References Cited

FOREIGN PATENT DOCUMENTS

| KR | 10-1720108 B1 | 3/2017 |
|---|---|---|
| KR | 10-2018-0080614 A | 7/2018 |

OTHER PUBLICATIONS

Office Action for the U.S. Appl. No. 15/931,366 issued by the USPTO dated Jun. 27, 2022.

* cited by examiner

I-I'

CELL UNIT FOR BATTERY MODULE

CROSS-REFERENCE TO RELATED APPLICATION(S)

This application is a continuation of U.S. patent application Ser. No. 15/931,366 filed on May 13, 2020, now U.S. Pat. No. 11,588,193 issued on Feb. 1, 2023, which claims the benefit under 35 USC 119(a) of Korean Patent Application No. 10-2019-0056206 filed on May 14, 2019 in the Korean Intellectual Property Office, the entire disclosure of which is incorporated herein by reference for all purposes.

BACKGROUND

1. Field

This application relates to a battery module.

2. Description of Related Art

Unlike primary batteries, secondary batteries may charge and discharge electrical energy. Thus, secondary batteries may be applied to various fields, for example, in the areas of digital cameras, mobile phones, notebook computers, hybrid vehicles, and the like. Examples of secondary batteries may include nickel-cadmium batteries, nickel-metal hydride batteries, nickel-hydrogen batteries, lithium secondary batteries, and the like.

Among such secondary batteries, a large amount of research into lithium secondary batteries having a relatively high energy density and a relatively high discharge voltage is in progress. Recently, lithium secondary batteries have been manufactured as pouched battery cells having flexibility. In this case, the pouched battery cells are provided as a plurality of pouched battery cell modules. The plurality of pouched battery cell modules may be configured to be connected and used as battery modules.

Meanwhile, when the battery module is used for a lengthy period of time, heat may be generated by the battery module. In particular, an internal temperature of the battery module may rise rapidly, during a charging operation thereof. In this case, such an increase in temperature of the battery module may shorten a lifespan of the battery module, may decrease efficiency of the battery module, and, in the worst case, ignition or explosion may occur therein.

Therefore, the battery module requires a cooling system for cooling the battery cells accommodated therein. However, in the related art an issue in which cooling efficiency may be significantly low because heat generated by the battery cells is not effectively dissipated has been encountered.

SUMMARY

Example embodiments of the present disclosure provide a battery module, capable of efficiently dissipating heat generated in a battery cell.

A battery module according to example embodiments includes a cell unit, including a plurality of battery cells disposed on both surfaces of a unit plate, and a case accommodating the cell unit and provided with a cooling device on at least one surface of the case. The unit plate includes a plurality of receiving spaces formed by a plate portion, having a flat surface, and a side portion protruding upwardly and downwardly of the plate portion from both sides of the plate portion. The plurality of battery cells are received in each of the receiving spaces.

In example embodiments, the case may include a first plate disposed below the cell unit, a second plate disposed above the cell unit, and a third plate disposed on a side portion of the cell unit and including the cooling device.

In example embodiments, the side portion may have an external surface disposed to oppose the third plate.

In example embodiments, the battery module may further include a heat transfer member disposed between the side portion and the third plate.

In example embodiments, the heat transfer member may be formed of one of thermal grease, a thermally conductive adhesive, and a pad.

In example embodiments, the third plate may include an internal side plate disposed to oppose the cell unit, an external side plate disposed outside of the internal side plate to be in contact with the internal side plate, and a cooling flow path provided between the internal side plate and the external side plate.

In example embodiments, the third plate may further include a reinforcing plate coupled to the external side plate while covering an external surface of the external side plate and formed of a material having greater rigidity than that of the external side plate.

In example embodiments, the third plate may be formed of aluminum, and the reinforcing plate may be formed of an ultrahigh-strength steel sheet.

In example embodiments, in the plate portion of the unit plate, a portion connected to the side portion may be formed to have a large thickness.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
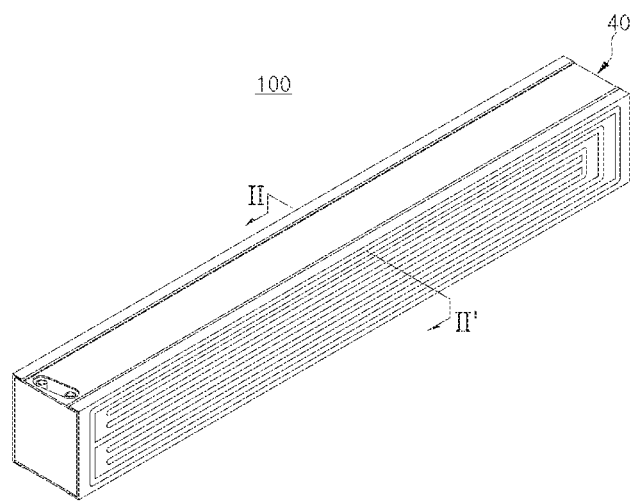
FIG. 1 is a schematic perspective view of a battery module according to example embodiments of the present disclosure.

Prior to the description, it should be understood that the terms used in the specification and the appended claims should not be construed as limited to general and dictionary meanings, but should be interpreted based on the meanings and concepts corresponding to technical aspects of the present disclosure on the basis of the principle that the inventor is allowed to define terms appropriately for the best explanation. Therefore, the configurations described in the following description with reference the accompanying drawings do not represent all technical concepts or ideas of the present disclosure but should be considered to be exemplary embodiments of the present disclosure. It should be understood that various modifications and equivalents of the embodiments may be devised within the scope of the present invention at the time of the filing of the application.

Hereinafter, example embodiments of the present disclosure will be described in detail with reference to the accompanying drawings. In the drawings, the sane elements are denoted by the same reference numerals as much as possible. Furthermore, detailed descriptions related to well-known functions or configurations may be omitted in order not to unnecessarily obscure subject matters of the present disclosure. For the same reason, some of the elements in the accompanying drawings are exaggerated, omitted, or shown schematically, and the size of each element may not entirely reflect the actual size.

Figure 2:
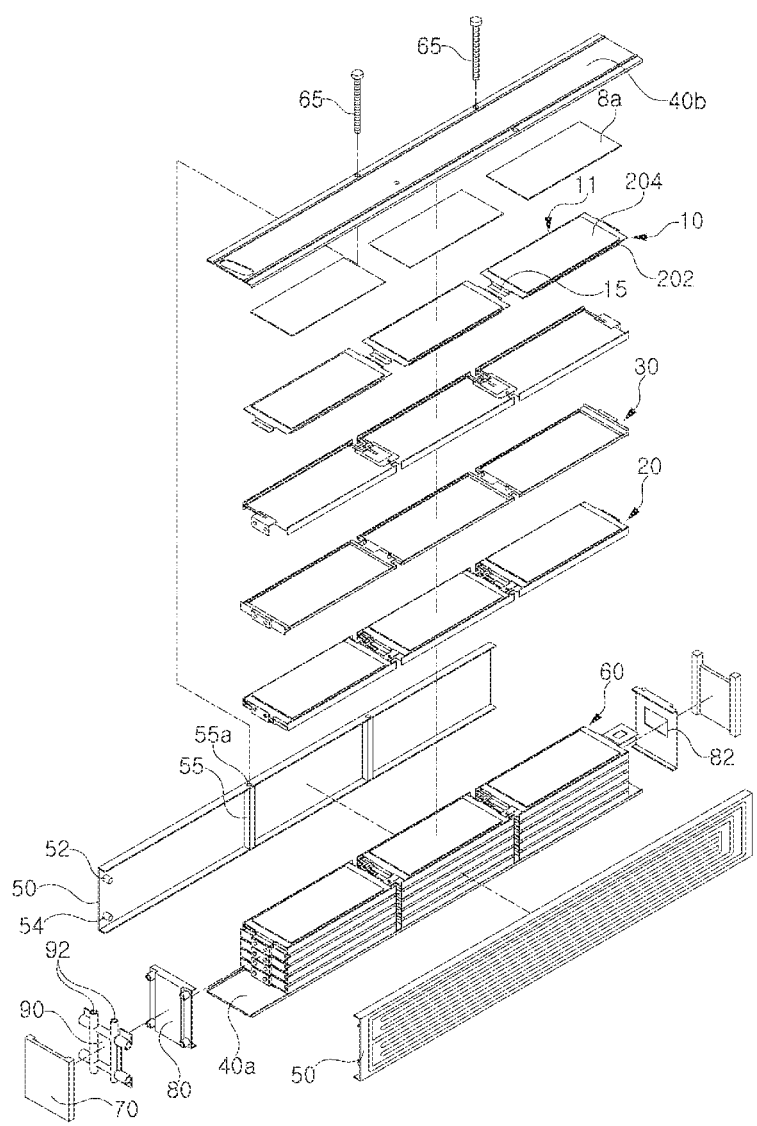
FIG. 2 is an exploded perspective view of the battery module illustrated in FIG. 1.

FIG. 1 is a schematic perspective view of a battery module according to example embodiments, and FIG. 2 is an exploded perspective view of the battery module illustrated in FIG. 1.

Figure 3:
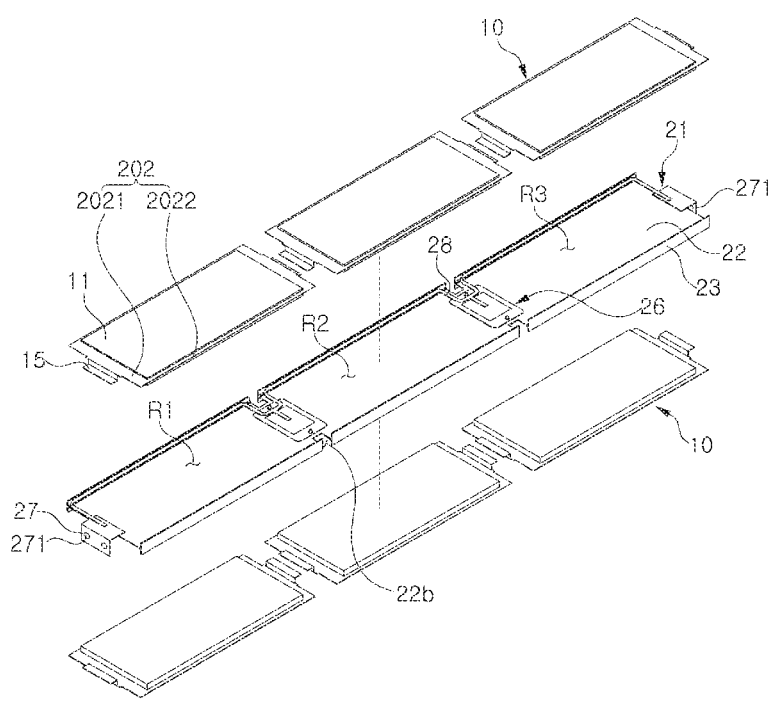
FIG. 3 is an exploded perspective view of a cell unit illustrated in FIG. 2.
Figure 4:
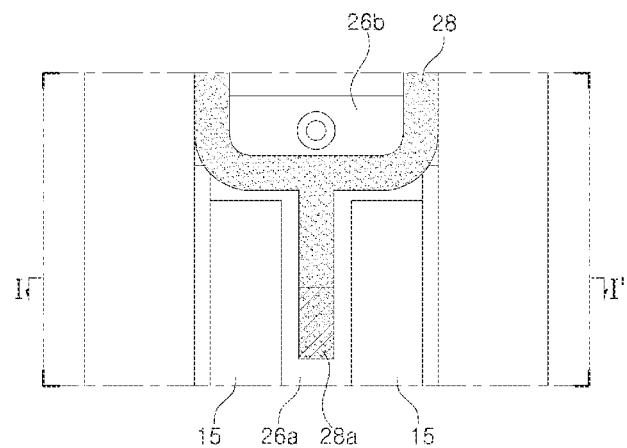
FIG. 4 is a partially enlarged plan view of a connection member of FIG. 3.
Figure 5:
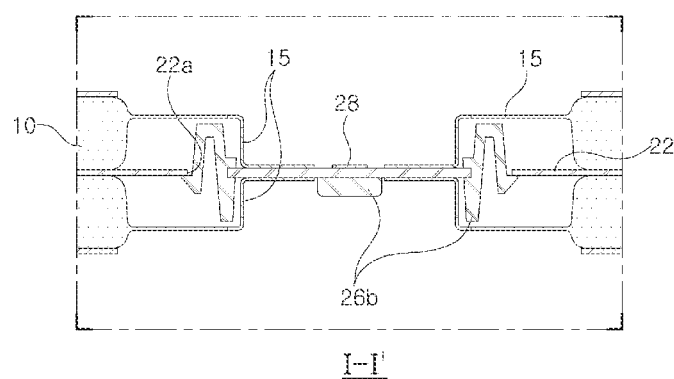
FIG. 5 is a cross-sectional view taken along line I-I' in FIG. 4.

FIG. 3 is an exploded perspective view of a cell unit illustrated in FIG. 2, FIG. 4 is a partially enlarged plan view of a connection member of FIG. 3, and FIG. 5 is a cross-sectional view taken along line I-I' in FIG. 4.

Figure 6:
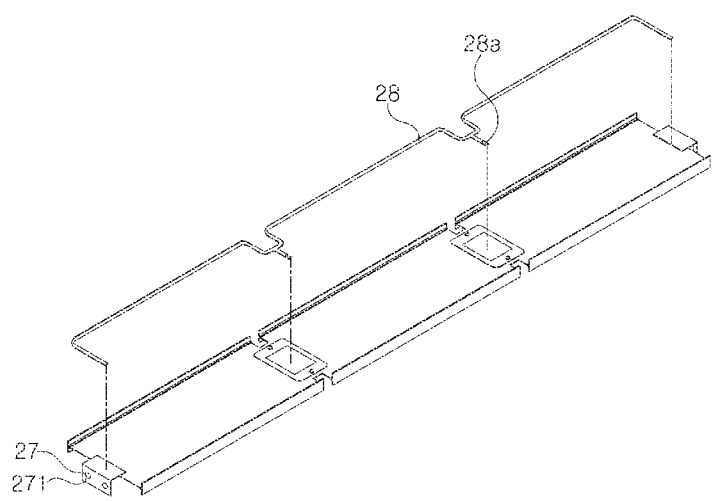
FIG. 6 is an exploded perspective view of a unit plate and a circuit board illustrated in FIG. 3.
Figure 7:
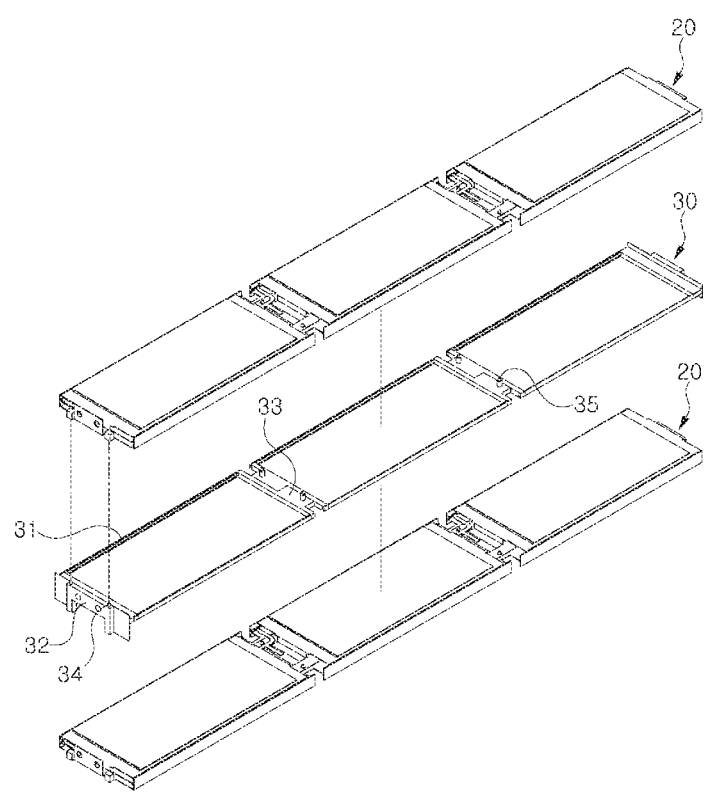
FIG. 7 is an exploded perspective view of a cell unit and a coupling unit illustrated in FIG. 2.
Figure 8:
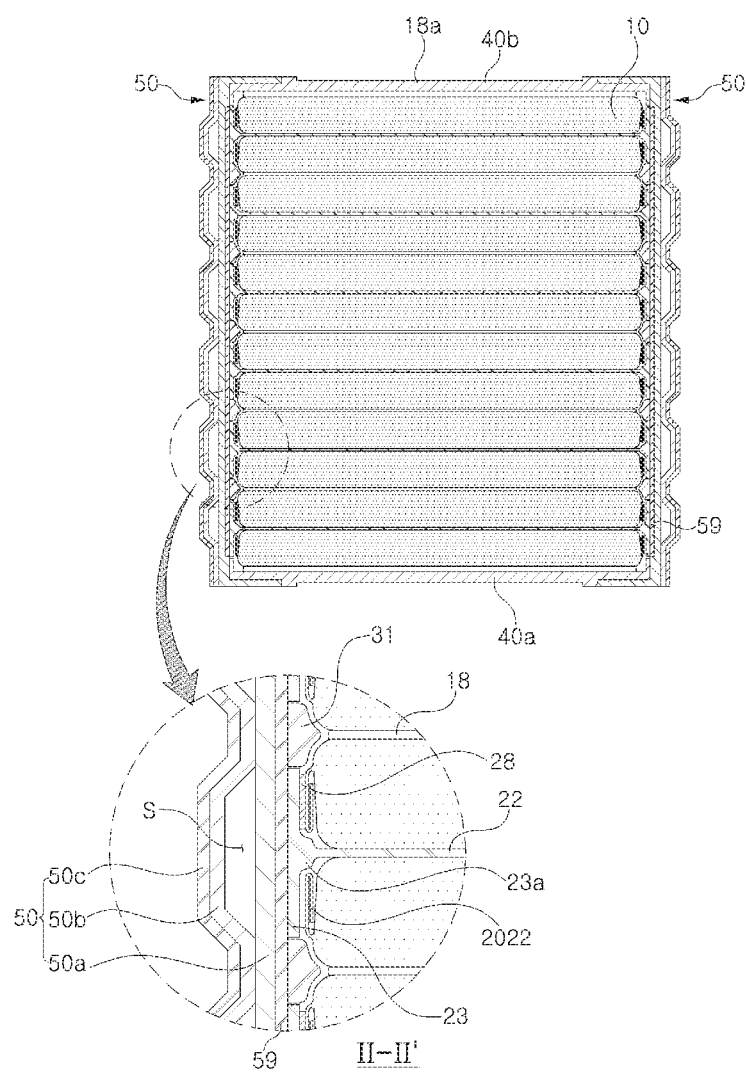
FIG. 8 is a cross-sectional view taken along line II-II' in FIG. 1.

FIG. 6 is an exploded perspective view of a unit plate and a circuit board illustrated in FIG. 3, FIG. 7 is an exploded perspective view of a cell unit and a coupling unit illustrated in FIG. 2, and FIG. 8 is a cross-sectional view taken along line II-II' in FIG. 1.

Referring to FIGS. 1 to 3, a battery module 100 according to this embodiment may have a substantially hexahedral shape and may include a cell assembly 60, in which a plurality battery cells 10 are coupled to each other, and a case 40 protecting the cell assembly 60 from the outside.

The cell assembly 60 includes a plurality of cells units 20 coupled to each other.

Referring to FIG. 3, the cell unit 20 includes a unit plate 21, a plurality of battery cells 10 stacked on the unit plate 21, and a circuit board 28.

The battery cell 10 may be provided as a plurality of battery cells stacked side by side, and may have a structure in which electrode leads 15 protrude outwardly of a body. The battery cell 10 may be, for example, a pouched secondary battery.

The battery cell 10 may have a configuration in which an electrode assembly, not illustrated, is accommodated in a pouch 11.

The electrode assembly may include a plurality of electrode plates and a plurality of electrode tabs, and may be accommodated in the pouch 11. Each of the electrode plates may include a positive electrode plate and a negative electrode plate, and the electrode assembly may have a configuration in which the positive electrode plate and the negative electrode plate are stacked such that relatively large surfaces oppose each other with a separator interposed therebetween.

The positive electrode plate and the negative electrode plate may be formed to have structure in which an active material slurry is coated on a current collector. The slurry may be formed by stirring a granular active material, an auxiliary conductor, a binder, a plasticizer, and the like, in a state in which a solvent is added.

In the electrode assembly, a plurality of positive electrode plates and a plurality of negative electrode plates may be vertically stacked. In this case, the plurality of positive electrode plates and the plurality of negative electrode plates may be provided with electrode tabs, respectively, and may be in contact with each other with the same polarity to be in connected to the same electrode lead 15.

In this embodiment, two electrode leads 15 are disposed to face in opposing directions.

The pouch 11 may be formed to have a container shape to provide an internal space in which the electrode assembly and electrolyte, not illustrated, are accommodated. In this case, a portion of the electrode lead 15 of the electrode assembly may be exposed outwardly of the pouch 11.

The pouch 11 may be divided into a sealing portion 202 and an accommodation portion 204.

The accommodation portion 204 may be formed to have a container shape to provide an internal space having a rectangular shape. The electrode assembly and the electrolyte may be accommodated in the internal space of the accommodation portion 204.

The sealing portion 202 may be formed to have a flange shape extending outwardly of the accommodation portion 204 formed to have the container shape. Therefore, the sealing portion 202 may be disposed to have an edge shape along an external surface of the accommodation portion 204.

A method of bonding sealing portions 202 to each other may be thermal fusion bonding, but the present disclosure is not limited thereto.

In this embodiment, the sealing portion 202 may be divided into a first sealing portion 2021, in which the electrode leads 15 are disposed, and a second sealing portion 2022 in which the electrode leads 15 are not disposed.

In this embodiment, since the electrode leads 15 are disposed to face in opposing directions, the two electrode leads 15 are disposed on the sealing portions 202 formed on different sides. Accordingly, the sealing portion 202 provided on four sides of the accommodation portion 204 includes two first sealing portions 2021, on which the electrode leads 15 are disposed, and two sealing portions 2022 on which the electrode leads 15 are not disposed.

The battery cell 10 according to this embodiment may constitute the sealing portion 202 while being folded at least once to improve bonding reliability of the sealing portion 202 and to significantly reduce an area of the sealing portion 202.

The battery cell 10 refers to a chargeable and dischargeable nickel metal hydride (Ni-MH) cell or lithium ion (Li-ion) cell, and generates current. A plurality of battery cells 10 are disposed in a line on both surfaces of the unit plate 21 to be described later.

The unit plate 21 includes a plate portion, with which the accommodation portion 204 of the battery cell 10 is in surface-contact, and side portions 23 disposed on both side surfaces of the plate portion 22 to protect the second sealing portion 2022 of the battery cell 10.

The plate portion 22 is formed as a flat surface, and the side portion 23 is formed to protrude upwardly and downwardly of the plate portion 22 from both edge portions of the plate portion 22. Accordingly, the unit plate 21 may be formed such that a cross section, obtained by cutting the plate portion 22 and the side portion 23, has an H-beam shape.

As illustrated in FIG. 8, a connection portion 23a of the plate portion 22, connected to the side portion 23, may be formed to have a thickness greater than a thickness of the other portion to secure rigidity. In this case, heat of the plate portion 22 may be more effectively transferred to the side portion 23. In addition, the entire external surface of the side portion 23 is disposed to face the third plate 50 provided with a cooling device, and is disposed to be significantly close to the third plate 50. Therefore, the heat transferred to the side portion 23 may be rapidly discharged to an external entity through the third plate 50.

A shape of the above-described connection portion 23a is not limited to a shape illustrated in the drawing, and may be variously modified as necessary, for example, forming an empty space in the connection portion 23a, or the like.

The unit plate 21 according to this embodiment has one surface, on which three battery cells 10 arranged in a line, and the other surface on which three battery cells 10 arranged in a line. Therefore, a total of six battery cells 10 are coupled to each other in a single unit plate 21. However, the present disclosure is not limited thereto, and one or two battery cells 10 may be disposed on each of both surfaces of the unit plate 21. As necessary, four or more battery cells 10 may be disposed on each of both surfaces of the unit plate 21.

As three battery cells 10 are disposed on each of both surfaces of the unit plate 21, the unit plate 21 has three battery cell receiving spaces R1, R2, and R3 on one surface thereof.

Each of the receiving spaces R1, R2, and R3 is defined by the plate portion 22 and the side portions 23. A connection member 26, to which the electrode lead 15 of the battery cell 10 is connected, is disposed between the receiving spaces R1, R2, and R3.

Referring to FIGS. 4 and 5, the connection member 26 may include a busbar 26a, formed of a conductive material, and a bracket 26b formed of an insulating material.

The bracket 26b is disposed along the circumference of a busbar 26a, and is in contact with the unit plate 21 when the connection member 26 is coupled to the unit plate 21. Therefore, when the connection member 26 is coupled to the unit plate 21, the busbar 26a is spaced apart from the unit plate 21, and thus, is not in direct contact with or not electrically connected to the unit plate 21.

The busbar 26a is formed of a flat metal plate, and has both surfaces exposed outwardly of the bracket 26b. Therefore, the battery cells 10 are bonded to both surfaces of the busbar 26a to be electrically connected to each other.

In this embodiment, two battery cells 10 are connected to one surface of the busbar 26a, and thus, a total of four battery cells 10 are connected to one busbar 26a.

The electrode lead 15 of the battery cell 10 is bent to be bonded to the busbar 26a by welding, or the like. However, a method of bonding the electrode lead 15 of the battery cell 10 is not limited thereto.

The busbar 26a and the bracket 26b may be manufactured through insert injection. However, a method of manufacturing the busbar 26a and the bracket 26b is not limited thereto, and the busbar 26a and the bracket 26b may be coupled to each other after being individually manufactured.

The unit plate 21 is provided with a coupling hole 22a in which the connection member 26 is coupled between the receiving spaces R1, R2, and R3. When the connection member 26 is coupled to the coupling hole 22a, the busbar 26a of the connection member 26 and the plate portion 22 may be disposed on the same plane, as illustrated in FIG. 5.

In this embodiment, the connection member 26 is coupled to the unit plate 21 in such a manner that the bracket 26b is fitted into the coupling hole 22a formed in the unit plate 21. An adhesive may be interposed between the connection member 26 and the unit plate 21 to stably couple the connection member 26 to the unit plate 21. As necessary, an additional fixing member such as a bolt or a screw may be used.

In the unit plate 21, two battery cells 10, disposed on both surfaces of the plate portion 22 to oppose each other with the plate portion 22 interposed therebetween, are connected in parallel through the connection member 26. In addition, three battery cells 10, disposed in a line on one of the surfaces of the unit plate 21, are connected in series through the connection member 26. Accordingly, in a single cell unit 20, a plurality of battery cells 10 are connected in parallel while two battery cells 10 constitute a pair, and the three battery cells 10 connected in parallel are connected in series.

As illustrated in FIG. 3, the unit plate 21 according to this embodiment is provided with fastening grooves 22b formed between the receiving spaces R1, R2, and R3 and the receiving space R1, R2, and R3, for example, in a portion in which the connection member 26 is disposed.

More specifically, the coupling groove 22b is formed in an external side of the connection member 26 as a groove formed in such a manner that the plate portion 22 and the side portion 23 are removed. Therefore, the fastening groove 22b is formed in such a manner that a width of the plate portion 22 or the cell unit is reduced, and the side portion 23 is discontinuously disposed by the fastening groove 22b.

The fastening groove 22b is a region in which a fastening portion 55 of the case 40, to be described later, is disposed. Therefore, the fastening groove 22b is formed to have a size at which the fastening portion 55 may be easily disposed.

An external connection member 27 is disposed on both end portions of the unit plate 21. Similarly to the above-described connection member 26, the external connection member 27 may include a bracket and a busbar.

Only two battery cells 10, disposed to oppose each other with the plate portion 22 interposed therebetween, are connected to a busbar 27a of the external connection member 27. The other portion of the busbar 27a is used as a terminal 271 electrically connecting the cell units 20 to each other (hereinafter referred to as a coupling terminal 271).

In the busbar 27a of the external connection member 27, a portion used as the coupling terminal 271 is disposed to protrude outwardly of the unit plate 21 and to be bent upwardly or downwardly of the plate portion 22.

The coupling terminal 271 is coupled to the coupling terminal 271 of another cell unit 20. Accordingly, the plurality of cell units 20 may be connected to each other in series or parallel through the coupling terminal 271. Welding or a fixing member such as a bolt or a screw may be used to connect the coupling terminals 271 to each other, but the present disclosure is not limited thereto.

The above-configured unit plate 21 serves as a cooling plate while supporting the battery cell 10. Heat, generated in the battery cell 10, is transferred to a third plate 50 to be described later through the plate portion 22 and the side portion 23 of the unit plate 21. In this embodiment, the third plate 50 serves as a cooling member. Accordingly, the heat of the battery cells 10 disposed on both sides of the plate portion 22 may be rapidly dissipated.

The circuit board 28 is connected to the busbar 26a of each of the connection members 26 to measure a voltage of the battery cell 10. The circuit board 28 may be provided with at least one temperature sensor 28a to measure a temperature of a battery and may further include a fuse, as necessary.

The temperature sensor 28a may be disposed to be in contact with the accommodation portion 204 or the sealing portion 202 of the battery cell 10, but the present disclosure is not limited thereto. In this embodiment, a negative temperature coefficient-thermal resistor (an NTC thermistor) is used as the temperature sensor 28a, but the present disclosure is not limited thereto.

The circuit board 28 should be electrically connected to an outside of the battery module to detect a voltage or a temperature of the battery cell from the outside of the battery module 100. Thus, the circuit board 28 should connect the temperature sensor 28a and the busbar 26a to the outside of the battery module.

To this end, the circuit board 28 according to this embodiment is formed as a flexible circuit board (FPCB). As illustrated in FIG. 8, the circuit board 28, disposed in the receiving spaces R1, R2, and R3, is disposed between the battery cell 10 and the side portion 23. More specifically, the circuit board 28 is attached to an internal side surface of the side portion 23 to be led outwardly of the unit plate 21 along the side portion 23. The circuit board 28, attached to the internal side surface of the side portion 23, may be firmly bonded to the side portion 23 through an adhesive or an adhesive tape.

A section, disposed in the receiving spaces R1, R2, and R3 of the circuit board 28, has a width less than a width of the side portion 23. Therefore, even when the circuit board 28 is disposed on the internal side surface of the side portion 23, the circuit board 28 is not exposed outwardly of the side portion 23.

Accordingly, the circuit board 28 may be led outwardly of the unit plate 21 without interference with the battery cell 10.

In the circuit board 28, a portion led outwardly of the unit plate 21 may be connected to an external entity through a connector, not illustrated, provided in a cover plate 70 to be described later.

The cell assembly 60 according to this embodiment is configured by stacking a plurality of cell units 20.

To this end, the cell assembly 60 includes a coupling unit 30 disposed between the cell units 20.

As illustrated in FIG. 7, the coupling unit 30 is disposed between two cell units 20, stacked in a vertical direction, to be fixedly coupled to the two cell units 20.

The coupling unit 30 may include a frame 31, disposed between the side portions 23 of the unit plate 21, and support portions 32 and 33 disposed on the end portions of the frame 31.

The support portions 32 and 33 may include a first support 32 and a second support 33.

The first support portion 32 supports both end portions of the cell unit 20. When the first support portion 32 is disposed between the coupling terminals 271 of the cell unit 20 to electrically connect the coupling terminals 271 to each other, the first support portion 32 may serve to fix the coupling terminals 271. To this end, the first support 32 may be provided with a fastening hole 36 in which a coupling member such as a bolt or screw, used when the coupling terminals 271 are coupled, is fastened. Accordingly, the fixing member penetrates through both of the two coupling terminals 271 and the fastening hole 36 to fixedly couple the coupling terminals 271 to the first support portion 32.

The first support 32 is provided with a first protrusion 34 protruding upwardly of the first support 32. The first protrusion 34 is provided for easy coupling to the external connection member 27 of the cell unit 20 stacked on the first protrusion 34. The first protrusion 34 may be inserted into a hole provided in the unit plate 21 or the external connection member 27.

The second support portion 33 is disposed between the connection members 26 of the cell unit 20 to support the connection member 26. Accordingly, when both end potions of the frame 31 are disposed between the connection members 26, second supports 33 may be disposed on both end portions of the frame 31, respectively.

The second support portion 33 may be configured to be coupled to and separated from a second support portion 33 of another frame 31. For example, the second support portion 33 may be configured to be fitted in and coupled to the second support 33 of another frame 31. However, the configuration of the second support portion 33 is not limited thereto, and the second supports 33 may be coupled to each other using an additional fixing member.

In addition, the second support portion 33 may be provided with a second protrusion 35 for easy coupling to the connection member 26. Similarly, the second protrusion 35 may also be configured to be inserted into a hole provided in the unit plate 21 or the connection member 26.

As described above, the first protrusion 34 and the second protrusion 35 define a coupled location of the cell unit 20. Accordingly, the cell unit 20 and the coupling unit 30 may be easily aligned and coupled to each other while assembling the cell assembly 60.

The frame 31 is formed to have a rectangular ring shape along a contour of the battery cell 10, and is disposed between the side portions 23 of the cell units 20 stacked in a vertical direction.

An inside of the frame 31 is formed as an empty space. Therefore, as illustrated in FIG. 8, when the cell units 20 are coupled to the coupling unit 30, a portion of the battery cell 10 coupled to the cell unit 20 is accommodated in the internal space of the frame 31. For example, when the battery cell 10 is coupled to the unit plate 21, a portion of the accommodation portion 204 of the battery cell 10 protrudes outwardly of the receiving spaces R1, R2, and R3 of the unit plate 21. The protruding portion is disposed in the internal space of the frame 31 of the coupling unit 30.

The coupling unit 30 according to this embodiment is provided with a plurality of frames 31. More specifically, the frames 31 are provided as many as the number of battery cells 10 arranged in a line in the cell unit 20 to be coupled to the coupling unit 30. Accordingly, in this embodiment, each of the coupling units 30 is provided with three frame. However, the number thereof is not limited thereto. An insulating pad 18 may be disposed between the battery cells 10, opposing each other, in the internal space of the frame 31.

The insulating pad 18 is formed of a compressed pad or a foam material to prevent direct contact between battery cells and to increase insulation. In addition, an assembly tolerance may be absorbed during a manufacturing process to enhance ease of assembling.

However, an example of the insulating pad 18 is not limited thereto, and various modifications, such as an insulating pad 18 formed of a double-sided adhesive tape or adhesive resin, may be made.

The insulating pad 16a, disposed between the cell assembly 60 and the first and second plates 40a and 40b, serves to prevent the overall volume of the battery cells from expanding when a specific battery cell expands. Can perform the function. Thus, the insulating pad 18a, disposed between the cell assembly 60 and the first and second plates 40a and 40b, may be formed of polyurethane foam. However, a material of the insulating pad 18a is not limited thereto.

The case 40 may include a first plate 40a coupled to a lower portion of the assembly 60, a second plate 40b coupled to an upper portion of the cell assembly 60, a third plate 50 coupled to a side surface of the cell assembly 60, and a cover plate 70, as illustrated in FIG. 2.

At least one of the first, second, and third plates 40a, 40b, 50 may serve as a cooling member of the battery module 100. In this embodiment, the third plate 50 serves as a cooling member. However, the configuration of the present disclosure is not limited thereto, and the first plate 40a or the second plate 40b may also be configured to serve as a cooling member having the same shape as the third plate 50, depending on a size of the battery cell 10.

To this end, the first, second, and third plates 40a, 40b, 50 may be formed of a material having high thermal conductivity such as metal. For example, the first, second, and third plates 40a, 40b, and 50 may be formed of aluminum. However, a material thereof is not limited thereto, and various materials may be used as long as the material has similar strength and thermal conductivity even if the material is not a metal.

The first plate 40a is disposed below the cell assembly 60 to support lower surfaces of the battery cells 10, and the second plate 40b is disposed above the cell assembly 60 to cover upper surfaces of battery cells 10. The third plate 50 is disposed on each of both side surfaces of the cell assembly 60 to be coupled to the first plate 40a and the second plate 40b. Thus, the first, second, and third plates 40a, 40b, and 50 constitute a tubular case.

The third plate 50 protects a side surface of the cell assembly 60, and cools the battery cell 10. To this end, the third plate 50 includes an internal plate 50a and an external plate 50b, as illustrated in FIG. 8.

The internal plate 50a is disposed on a side of the cell assembly 60, and the external plate 50b is disposed on an external side of the internal plate 50a and coupled to the external surface of the internal plate 50a.

The inner plate 50a is coupled to the above-described first and second plates 40a and 40b. The external plate 50b is bonded to an external surface of the internal plate 50a. In this case, the entirety of the external plate 50b may not be bonded and at least a portion thereof may be bonded. At least a portion of the unbonded portion may be spaced apart from the internal plate 50a. Thus, a space is formed between the internal plate 50a and the external plate 50b to be used as a cooling flow path (S in FIG. 8)

The external plate 50b may be bonded to the internal plate 50a through welding or brazing. As necessary, the external plate 50b may be bonded to internal plate 50a using an adhesive.

The cooling flow path S is disposed in the entire external plate 50b. A shape of the cooling passage S may be variously modified, as necessary.

The above-configured external plate 50b may be manufactured by pressing a metal plate. In this embodiment, the internal plate 50a and the external plate 50b are formed of the same material (for example, aluminum). However, the material thereof is not limited thereto, and the internal plate 50a and the external plate 50b may be formed of different materials to each other.

In this embodiment, one side of the internal plate 50a is provided with an inlet 52 and an outlet 54 of a cooling flow path S. Accordingly, cooling water is introduced into the above-described cooling flow path S through the inlet 52 and passes through the cooling flow path S, and is then discharged outwardly of the cooling flow path S through the outlet 54. However, the configuration of the present disclosure is not limited thereto. As necessary, locations of the outlet 54 and the inlet 52 may be variously modified. For example, the outlet 54 and the inlet 52 may be disposed on the external plate 50b or the external plate 50b, or may be disposed the external plate 50b and the external plate 50b, respectively.

The third plate 50 according to this embodiment is used as a water-cooled cooling device having a cooling flow path S therein. However, the configuration of the present disclosure is not limited thereto, and an air-cooled cooling device may be applied.

Referring to FIG. 2, in the third plate 50 according to this embodiment, a fastening portion 55 is formed on an internal surface opposing the cell assembly 60. The fastening portion 55 is disposed to protrude from the internal surface of the third plate 50 to a side of the cell assembly 60, and has a fastening hole 55a formed therein.

The fastening portion 55 is formed to have a pipe shape to be bonded to an internal surface of the third plate 50. In this case, the fastening portion 55 is disposed to be inserted into the coupling groove (22b in FIG. 3) of the above-described unit plate 21. Accordingly, the coupling portion 55 has a size enough to be insertable into the coupling groove 22b. Each of the first plate 40a and he second plate 40b is provided with a through-hole into which the fastening member 65 is inserted in a location corresponding to the fastening grooves 22b.

As the cell unit 20 is stacked in a vertical direction, the fastening groove 22b is formed to penetrate through the cell assembly 60 in the vertical direction. Accordingly, the coupling portion 55 is also disposed in the coupling groove 22b to penetrate through the cell assembly 60 in the vertical direction.

The fastening hole 55a is a hole, into which the fastening member 65 such as a bolt or a screw is inserted and coupled, and is used to fix the battery module 100 to a structure or the like.

The fastening member 65 sequentially penetrates through the first plate 40a, the fastening hole 55a of the third plate 50, and the second plate 40b to be fixedly fastened to the second plates 40a and 40b.

In the fastening member 65, a portion protruding downwardly of the second plate 40b is fastened to a structure (for example, a vehicle, or the like) in which the battery module 100 is mounted.

When the fastening portion 55 is not provided, it may be difficult to secure rigidity of the third plate 50 in the vertical direction. In this case, when external force is applied to the battery module 100 in the vertical direction, the second plate 40b is readily damaged. For example, the third plate 50 may also be deformed by a force applied to fasten the fastening member 65 to the structure.

However, as in this embodiment, when the fastening portion 55 is provided and the first plate 40a and the second plate 40b are respectively disposed below and above the coupling portion 55, the fastening member 65 sequentially penetrates through the first plate 40a, the fastening portion 55, and the second plate 40b to be fastened to the structure.

Accordingly, even when an external force is applied in the vertical direction, the third plate 50 is not readily deformed by the fastening portion 55 disposed between the first plate 40a and the second plate 40b.

In addition, the fastening portion 55 is inserted into the fastening groove 22b. When the fastening groove 22b is not present, a distance between the third plates 50 should be increased or the fastening portion 55 should be disposed on an external surface of the third plate 50, rather than an internal surface of the third plate 50. In this case, a volume of the battery module may be increased.

However, since the battery module 100 according to this embodiment is provided with a fastening groove 22b in the unit plate 21, the fastening portion 55 may be disposed in a space formed in the cell assembly 60. Thus, the above-mentioned issues may be addressed.

Referring to FIG. 8, a heat transfer member 59 may be disposed between the cell assembly 60 and the case 40.

In this embodiment, the heat transfer member 59 is disposed between the cell assembly 60 and the third plate 50. Specifically, the heat transfer member 59 is disposed between an external surface of the side portion 23 and an internal surface of an internal side plate 50a of the third plate 50. However, a location of the heat transfer member 59 is not limited thereto, and the heat transfer member 59 may be disposed on sides of the first and second plate 40a and 40b, as necessary.

The heat transfer member 59 may be formed of a material having high heat conductivity. In addition, the heat transfer member 59 may be formed of thermal grease, a thermally conductive adhesive formed of an epoxy-based resin, a urethane-based, a silicone-based resin, or an acryl-based resin, and a pad.

The heat transfer member 59 may be formed by applying a liquid or gel-state material to the internal surface of the third plate 50. Accordingly, the heat transfer member 59 is disposed to fill a space between the cell assembly 60 and the third plate. However, a location of the heat transfer member 59 is not limited thereto, and a pad-shaped heat transfer member 59 may be inserted.

The heat transfer member 59 absorbs an assembly tolerance between the cell assembly 60 and the third plate 50. Thus, the cell assembly 60 may be firmly fixed to the case 40 in an internal space of the case 40 by the heat transfer member 59, and heat dissipated from the cell assembly 60 may be rapidly transferred to the third plate 50 through the heat transfer member 59. In addition, as the heat transfer member 59 is disposed between the cell assembly 60 and the case 40, overall rigidity of the battery module 100 may be enhanced.

The third plate 50 according to this embodiment may include a reinforcing plate 50c coupled to an external surface of the external side plate 50b.

The reinforcing plate 50c is provided to reinforce the rigidity of the second plate 40b. Therefore, the reinforcing plate 50c is coupled to the external plate 50b to cover an entire external surface of the external plate 50b, and is formed of a material having rigidity greater than rigidity of the internal plate 50a or the external plate 50b.

For example, the reinforcing plate 50c may be formed of an ultrahigh-strength steel sheet having tensile strength of 1 giga Pascal (GPa) or more, but the present disclosure is not limited thereto.

The cover plate 70 is coupled to each of both end portions of the cell assembly 60.

The cover plate 70 is coupled to the first, second, and third plates 40a, 40b, 50 to complete an exterior of the battery module 100.

The cover plate 70 may be formed of an insulating material such as resin, and may be provided with a groove or a hole for exposing the connection terminal 272 to an external entity. The connection terminal 272 may be used to electrically connect the battery module to an external entity, and may be one of the coupling terminals 271 provided in the cell unit 20. In addition, the cover plate 70 may e provided with a connector, not illustrated, connected to the circuit board 28.

The cover plate 70 may be coupled to the first, second, third plate 40a, 40b, and 50 through a fixing member such as a screw or a bolt. However, coupling of the cover plate 70 is not limited thereto.

An insulating cover 80 and a flow path connection portion 90 may be disposed between the cover plate 70 and the cell assembly 60.

The insulation cover 80 is formed of an insulating material and is coupled to both ends of the cell assembly 60, to which the coupling terminals 271 are coupled, to protect the coupling terminals 271 of the cell assembly 60 and to maintain insulation.

At least one of the insulating cover 80 may be provided with a hole 82 through which the connection terminal 72 is disposed. The connection terminal 72 is exposed to an external entity through the hole 82 formed in the insulating cover 80. Therefore, the through hole 82 of the insulating cover 80 is formed to have a size corresponding to a size and a shape of the connection terminal 272.

Although not illustrated, a heat transfer member may fill a space between the insulating cover 80 and the cell assembly 60, as necessary.

The flow path connection portion 90 is disposed between the insulating cover 80 and the cover plate 70 and has a flow path through which the cooling water passes. The flow path of the flow path connection portion 90 is connected to each of the inlet 52 and the outlet 54 provided in the third plate 50.

The flow path connection portion 90 is used as a path for supplying cooling water to the battery module 100 from a device or equipment in which the battery module 100 is mounted. To this end, a flow path of the flow path connection portion 90 includes an inlet and outlet 92 connected to an external entity.

Accordingly, the cooling water supplied to the flow path connection portion 90 through the inlet and outlet 92 is supplied to the cooling flow path S of the third plate 50 through the inlet 52 of the third plate 50. The cooling water, passing through the cooling flow path S, returns to the flow path connection portion 90 and is then discharged outwardly of the battery module 100 through the inlet and outlet 92.

In the above-configured battery module 100 according to this embodiment, cooling devices are disposed on both sides of the cell assembly 60, respectively. Since the unit plate 21 is disposed between the battery cells 10, heat may be rapidly transferred to the cooling devices through the unit plate 21. Thus, heat generated in the battery cell 10 may be effectively dissipated.

In addition, since the cell assembly 60 is completed by stacking a plurality of cell units 20, the battery module 100 may be easily manufactured, and the battery module 100 may be manufactured to have various sizes and capacities depending on the number of cell units 20.

In addition, since the third case is provided with a cooling flow path S, the cell assembly 60 and the cooling channel S are disposed as close as possible, and thus, cooling efficiency of the cell assembly 60 may be enhanced.

As described above, since a battery module according to an example embodiment includes a unit plate disposed between battery cells, heat may be rapidly transferred to a side of a cooling device through the unit plate. Thus, heat generated in the battery cell may be effectively dissipated.

In addition, since a cell assembly is completed by stacking a plurality of cell units, the battery module may be easily manufactured.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A cell unit comprising:
   a unit plate including a plurality of receiving spaces mechanically connected in series, each of the plurality of receiving spaces having a plate portion and the plurality of receiving spaces are formed in pairs at opposite surfaces of the plate portion, each of the plurality of receiving spaces being configured to receive a battery cell; and
   a plurality of connection members disposed between the plurality of receiving spaces,
   wherein each connection member couples the battery cells in each pair of the plurality of receiving spaces electrically in parallel to each other,
   wherein each connection member further couples the battery cells accommodated in the plurality of receiving spaces that are positioned at a same surface of the plate portion electrically in series to each other, and
   wherein each connection member includes a busbar formed of a conductive material and a bracket formed of an insulating material, and
   wherein the bracket is disposed along the circumference of the busbar, and is in contact with the plate portion when the connection member is coupled to the plate portion.

2. The cell unit of claim 1, further comprising a circuit board connected to the busbar of each of the connection members, the circuit board including at least one temperature sensor.

3. The cell unit of claim 1,
   wherein each unit plate is provided with a coupling hole in which a corresponding connection member is coupled.

4. The cell unit of claim 3,
   wherein when the corresponding connection member is coupled to the coupling hole, a busbar of the connection member and the plate portion are disposed on the same plane.

5. The cell unit of claim 1, further comprising an external connection member disposed on both end portions of the unit plate, each external connection member including a bracket and a busbar.

6. The cell unit of claim 5,
   wherein in the busbar of the external connection member, a portion is used as a coupling terminal to be coupled to another coupling terminal of another cell unit so that a plurality of cell units are connected to each other in series or parallel through the coupling terminals.

7. The cell unit of claim 1,
   wherein the unit plate serves to dissipate heat generated in the battery cells to a cooling plate.

* * * * *